(12) United States Patent
Schneider et al.

(10) Patent No.: US 7,088,720 B1
(45) Date of Patent: Aug. 8, 2006

(54) MULTISERVICE USE OF NETWORK CONNECTION CAPABILITY UNDER USER-TO-NETWORK INTERFACE SIGNALING

(75) Inventors: Marco Schneider, Austin, TX (US); Philip Cunetto, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 731 days.

(21) Appl. No.: 09/633,865

(22) Filed: Aug. 7, 2000

(51) Int. Cl.
*H04L 12/28* (2006.01)
*H04L 12/54* (2006.01)
*H04L 12/66* (2006.01)

(52) U.S. Cl. .................. 370/395; 370/352; 370/410

(58) Field of Classification Search .............. 370/230, 370/389, 395–398, 260–271, 254–259, 351–360, 370/401–422, 522; 709/203–219, 224–229, 709/238
See application file for complete search history.

(56) References Cited

U.S. PATENT DOCUMENTS

| | | |
|---|---|---|
| 4,494,231 A | 1/1985 | Slawy et al. |
| 5,051,982 A | 9/1991 | Brown et al. |
| 5,274,643 A | 12/1993 | Fisk |
| 5,490,141 A | 2/1996 | Lai et al. |

(Continued)

FOREIGN PATENT DOCUMENTS

EP 0961519 12/1999

(Continued)

OTHER PUBLICATIONS

"Telcos to Open ATM SVC Floodgate", by Brian Riggs, which was published Mar. 1997, pp. 1-3, <www.lantimes.com>.

(Continued)

*Primary Examiner*—Man U. Phan
(74) *Attorney, Agent, or Firm*—Greenblum & Bernstein, P.L.C.

(57) ABSTRACT

Method and apparatus for a distributed switching system supporting a plurality of services. A service request is initiated by an initiating customer. The service request is then executed using, for example, a user-to-network interface setup. A terminating setup is then performed to either accept or reject the requested service. Multiple service requests are correlated with respective services to enable at least one appropriate policy and logic. Data related to the requested service is obtained using at least one of a push procedure, a pull procedure, a query procedure, and a procedure in which requests are associated with the issuance of certificates.

39 Claims, 6 Drawing Sheets

U.S. PATENT DOCUMENTS

| | | | |
|---|---|---|---|
| 5,610,969 A * | 3/1997 | McHenry et al. | 455/435.2 |
| 5,764,645 A | 6/1998 | Bernet et al. | |
| 5,828,838 A | 10/1998 | Downs et al. | |
| 5,842,040 A * | 11/1998 | Hughes et al. | 710/11 |
| 5,892,924 A * | 4/1999 | Lyon et al. | 709/245 |
| 5,905,726 A | 5/1999 | Cupta | |
| 5,920,562 A | 7/1999 | Christie et al. | |
| 5,923,740 A | 7/1999 | Ito et al. | |
| 5,943,337 A | 8/1999 | Sasagawa | |
| 5,953,338 A * | 9/1999 | Ma et al. | 370/395.21 |
| 5,956,334 A | 9/1999 | Chu et al. | |
| 5,970,064 A * | 10/1999 | Clark et al. | 370/351 |
| 5,974,048 A | 10/1999 | Godse et al. | |
| 5,991,301 A | 11/1999 | Christie | |
| 5,999,514 A | 12/1999 | Kato | |
| 5,999,518 A | 12/1999 | Nattkemper et al. | |
| 5,999,532 A | 12/1999 | Terasaki | |
| 6,028,924 A | 2/2000 | Ram et al. | |
| 6,028,933 A | 2/2000 | Heer et al. | |
| 6,031,840 A | 2/2000 | Christie et al. | |
| 6,032,118 A | 2/2000 | Tello et al. | |
| 6,035,405 A | 3/2000 | Gage et al. | |
| 6,041,056 A | 3/2000 | Bigham et al. | |
| 6,041,109 A * | 3/2000 | Cardy et al. | 379/201.01 |
| 6,073,160 A | 6/2000 | Grantham et al. | |
| 6,081,518 A | 6/2000 | Bowman-Amuah | |
| 6,094,437 A | 7/2000 | Loehndorf, Jr. et al. | |
| 6,097,720 A | 8/2000 | Araujo et al. | |
| 6,097,722 A | 8/2000 | Graham et al. | |
| 6,118,785 A | 9/2000 | Araujo et al. | |
| 6,137,793 A | 10/2000 | Gorman et al. | |
| 6,141,339 A | 10/2000 | Kaplan et al. | |
| 6,148,074 A | 11/2000 | Miloslavsky et al. | |
| 6,167,432 A | 12/2000 | Jiang | |
| 6,169,735 B1 | 1/2001 | Allen, Jr. et al. | |
| 6,181,693 B1 | 1/2001 | Maresca | |
| 6,219,348 B1 | 4/2001 | Allen, Jr. et al. | |
| 6,222,842 B1 | 4/2001 | Sasyan et al. | |
| 6,229,810 B1 | 5/2001 | Gerszberg et al. | |
| 6,252,857 B1 | 6/2001 | Fendick et al. | |
| 6,289,001 B1 | 9/2001 | Smyk | |
| 6,292,495 B1 | 9/2001 | Von Hammerstein et al. | |
| 6,298,043 B1 | 10/2001 | Mauger et al. | |
| 6,345,048 B1 | 2/2002 | Allen, Jr. et al. | |
| 6,345,051 B1 | 2/2002 | Gupta et al. | |
| 6,366,577 B1 * | 4/2002 | Donovan | 370/352 |
| 6,366,948 B1 | 4/2002 | Teibel | |
| 6,373,930 B1 * | 4/2002 | McConnell et al. | 379/114.28 |
| 6,389,011 B1 | 5/2002 | Allen, Jr. et al. | |
| 6,400,716 B1 | 6/2002 | Munakata et al. | |
| 6,434,612 B1 | 8/2002 | Hughes et al. | |
| 6,473,427 B1 | 10/2002 | Brodigan | |
| 6,473,430 B1 | 10/2002 | Sreedharan et al. | |
| 6,529,479 B1 | 3/2003 | Suzuki | |
| 6,542,475 B1 * | 4/2003 | Bala et al. | 370/271 |
| 6,563,835 B1 * | 5/2003 | Chen | 370/410 |
| 6,597,689 B1 | 7/2003 | Chiu et al. | |
| 6,618,381 B1 * | 9/2003 | Miyamoto et al. | 370/395.43 |
| 6,621,793 B1 | 9/2003 | Widegren et al. | |
| 6,633,569 B1 * | 10/2003 | Hemmady | 370/398 |
| 6,636,516 B1 | 10/2003 | Yamano | |
| 6,741,585 B1 | 5/2004 | Munoz et al. | |
| 6,801,508 B1 | 10/2004 | Lim | |
| 6,804,247 B1 | 10/2004 | Saayan et al. | |
| 6,807,174 B1 | 10/2004 | Bernstein et al. | |
| 6,822,962 B1 | 11/2004 | Noake et al. | |
| 6,842,449 B1 | 1/2005 | Hardjono | |
| 6,859,457 B1 | 2/2005 | Tanaka | |
| 6,870,841 B1 | 3/2005 | Brown et al. | |
| 6,928,167 B1 | 8/2005 | Maeda et al. | |
| 6,937,595 B1 | 8/2005 | Barzegar et al. | |
| 6,937,598 B1 | 8/2005 | Hagirahim et al. | |
| 2001/0026553 A1 | 10/2001 | Gallant et al. | |
| 2002/0010866 A1 | 1/2002 | MacCullough et al. | |
| 2002/0024954 A1 | 2/2002 | Cunetto et al. | |
| 2002/0071427 A1 | 6/2002 | Schneider et al. | |
| 2002/0126674 A1 | 9/2002 | Hemmady | |
| 2002/0143959 A1 | 10/2002 | El-Baze et al. | |
| 2002/0150110 A1 | 10/2002 | Inber et al. | |
| 2002/0156914 A1 * | 10/2002 | Lo et al. | 709/238 |
| 2003/0016676 A1 | 1/2003 | Allen et al. | |
| 2003/0031184 A1 | 2/2003 | Cunetto et al. | |
| 2003/0128698 A1 * | 7/2003 | Darland et al. | 370/360 |
| 2003/0133454 A1 | 7/2003 | Gallant et al. | |
| 2004/0107238 A1 | 6/2004 | Orton et al. | |

FOREIGN PATENT DOCUMENTS

| | | | |
|---|---|---|---|
| EP | 1316177 | | 6/2003 |
| JP | 8-186580 | | 7/1996 |
| WO | WO 98/26627 | * | 6/1998 |
| WO | 98/36612 | | 8/1998 |
| WO | 98/37727 | | 8/1998 |
| WO | 99/30530 | | 6/1999 |
| WO | 00/62496 | | 10/2000 |
| WO | 02/12977 | | 2/2002 |
| WO | 03/009528 | | 1/2003 |

OTHER PUBLICATIONS

"Voice Over ATM Switched Virtual Circuits on the Cisco MC3810", pp. 1-5, <www.cisco.com>.

"Do You Need Frame-to-ATM SVC", by Steve Taylor et al., which was published Jun. 2000, pp. 1-2, <www.nwfusion.com>.

English Language Abstract of JP-8-186580.

cnfport: Configure Port—PXM1E, Cisco MGX 8830, MGX 8850 (PXM45 and PXM1E), and MGX 8950 Command Reference, Release 3, Part No. 78-14789-01 Rev. B0, Jan. 2003, p. 2-299.

"dspport: Display Port—PXM1E", Cisco MGX 8830, MGX 8850 (PXM45 and PXM1E), and MGX 8950 Command Reference, Release 3, Part No. 78-14789-01 Rev. B0, Jan. 2003, p. 2-749.

"Ipsilon's General Switch Management Protocol Specification: The Internet Society, 1998", version 2, by Newman et al., The Internet Society, Network Working Group, 1998, pp. 1-79.

Yager, C., "White Paper: Cisco Asymmetric Digital Subscriber Line Services Architecture", Cisco Systems, published on Jul. 3, 2000.

"SIP Extensions for Media Authorization," by W. Marshall et al., dated Feb. 2001, pp. 1-23, <draft-ietf-sip-call-auth-01.txt>.

"SIP Extensions for Media Authorization," by W. Marshall et al., dated Nov. 2000, pp. 1-25, <draft-ietf-sip-call-auth-00.txt>.

Printout of a website entitled "Abstract—Security For Asynchronous Transfer Mode (ATM) Networks", WPI Department of Electrical and Computer Engineering, last modified on Apr. 23, 1996.

Printout of a website entitled "ATM Security VPN Case Study", by Winkelstein, Celotek Corporation.

Clark et al., "Bandwidth-on-Demand Networks—A Solution to Peer-to-Peer File Sharing", BT Technology Journal, vol. 20, No. 1, Jan. 2002, pp. 53-63.

Loeser et al., "Distributed Video on Demand Services on Peer to Peer Basis", 1st International Workshop on Real Time LANs in the Internet Age, Jun. 18, 2002, pp. 1-4, http://www.hurray.isep.ipp.pt/rtlia2002/full_paper/20_rtlia.pdf.

"Efficient Routing of Packets for Multimedia Streams to Packet Streams", IBM Technical Disclosure Bulletin, May 1994, pp. 459-260.

"Method for the Conversion of Multimedia Streams to Packet Streams", IBM Technical Disclosure Bulletin, Jun. 1994, pp. 95-98.

Bauer et al., "The Personal Router", The Eight ACM International Conference on Mobile Computing and Networking, Sep. 23-28, 2002, p. 1.

"User Interface Design for Videoconferencing Entries", IBM Technical Disclosure Bulletin, Apr. 1994, pp. 539-540.

Clark et al., "The Personal Router Whitepaper", MIT Laboratory for Computer Science, Version 2.0,; Mar. 2001, http://ana.lcs.mit.edu/anaweb/PDF?PR-whitepaper_v2.pdf.

P.W. Reece et al., "The Broadband Call Control Demonstrator—A Platform for ITU-T, DAVIC and TINA-C Implementations", BT Technology Journal, vol. 16, No. 2, Apr. 1, 1998, pp. 155-168.

Sihui Zhou et al., "Efficient Location Management for Hybrid Wireless ATM Networks; Architecture and Performance Analysis", 1999, IEEE, pp. 378-381.

* cited by examiner

MULTISERVICE USE OF NETWORK CONNECTION CAPABILITY UNDER USER-TO-NETWORK INTERFACE SIGNALING

BACKGROUND OF THE INVENTION

1. Field of the Invention

The present invention is directed to a distributed switching system, such as, for example, a Multiservice Switching System based on, for example, frame, cell or packet switching, that supports video, private line and data services.

2. Discussion of Background and Related Information

A Multiservice Switching System (MSS) comprises a distributed switching device designed to support plural forms of data, such as, but not limited to, for example, voice, computer data and video signals. Switching can be based on, for example, but not limited to, frame, cell, or packet switching. Multiservice Switching Systems may use a broad range of access technologies, including, but not limited to, for example, time division multiplexing (TDM), digital subscriber lines (xDSL), wireless, and cable modems.

In an ATM switched virtual circuit (SVC) service, a SVC customer can either initiate or terminate a SVC service request via a user-to-network (UNI) interface. The SVC customer may be, but is not limited to, for example, an individual subscriber, an enterprise network, an ISP, or a peer network. Service policies define the capabilities and resources available to the customer. The service policies also determine whether a service request succeeds or fails.

The amount of data being transmitted between locations has rapidly escalated. Voice networks (e.g., traditional telephone networks) are becoming overwhelmed by the rapidly increasing traffic flow. Further, it is costly to construct/expand such traditional telephone networks. As a result, companies are searching for ways to carry voice services over packet networks, and for removing data traffic from the voice networks. This has led to the development of media gateways and media gateway controllers (referred to as distributed switches) that separate the service intelligence from the associated hardware, and allows voice and data to be carried over a packet network.

Conventional architectures do not permit the separation of a service controller from a transport controller. For example, in a conventional ATM switch, a calling party uses the UNI protocol to request an ATM SVC connection to another end system that is connected to the network. This request is carried by a signaling channel to an ATM edge switch, which terminates the UNI protocol and initiates a private network—network interface (PNNI) protocol to complete a setup across the network to the edge switch that connects to the called party. The application of policy and decision to reject or accept a call is determined solely by an on-board processor within the switch. That is, service control is packaged into the switch. No standardized ATM mechanism currently exists to utilize service control outside of the switch.

BRIEF DESCRIPTION OF THE DRAWINGS

The foregoing and other objects, features and advantages of the invention will be apparent from the following more particular description of preferred embodiments, as illustrated in the accompanying drawings, which are presented as a non-limiting example, in which reference characters refer to the same parts throughout the various views, and wherein.

DETAILED DESCRIPTION OF EMBODIMENTS

Figure 1:
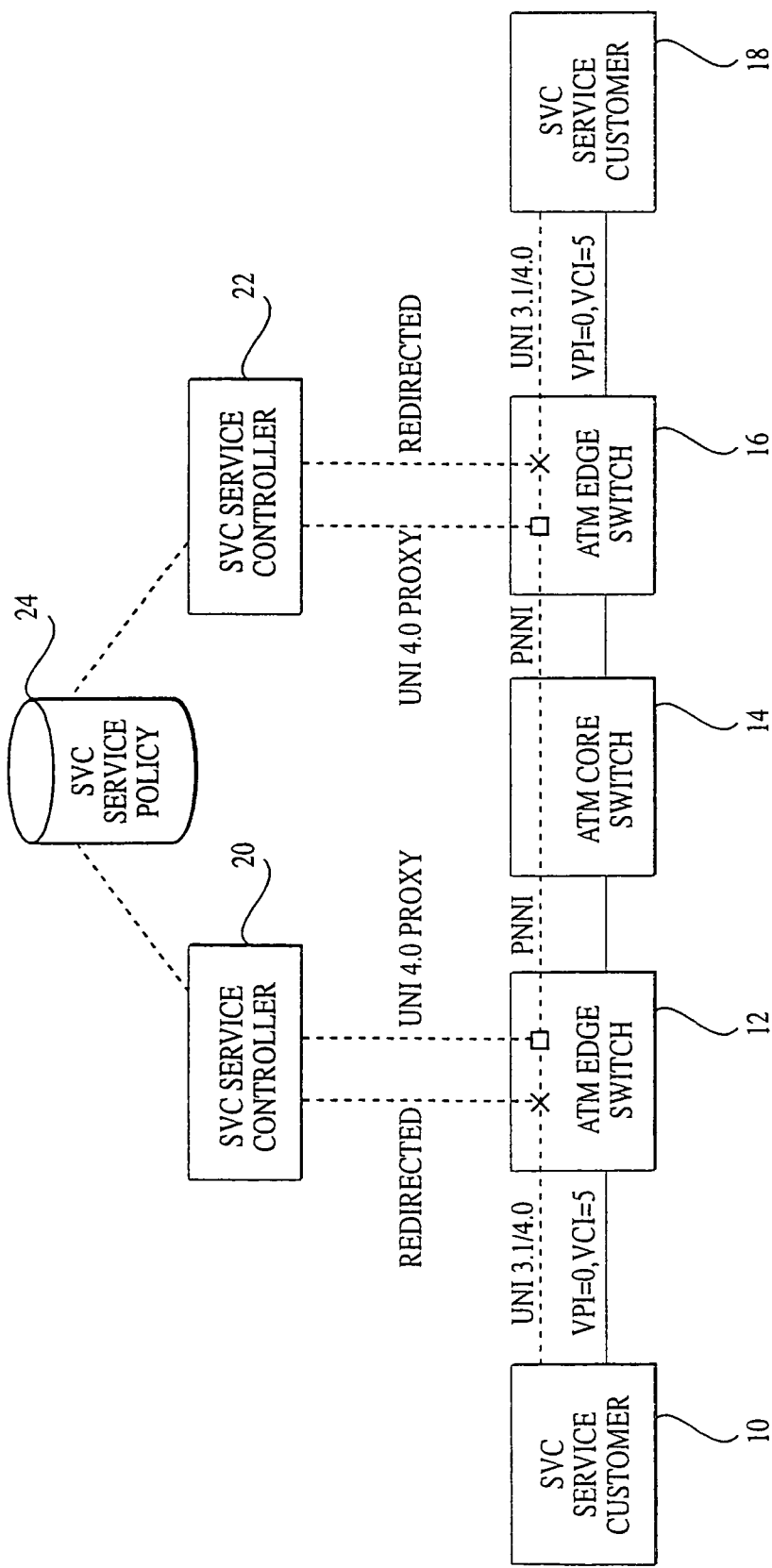
FIG. 1 illustrates an example ATM SVC service that utilizes intelligence separate from conventional ATM Switches that are useable with the present invention.

Accordingly, an object of the current invention is to provide a mechanism whereby a switch, such as, for example, an ATM switch, can access an external service control. In particular, the present invention allows multiple network services to share a network connection capability in such a way that a predetermined signal, such as, for example, UNI signaling, is interpreted via service specific controls (such as, for example, data, policies and transformations) contained within the network. This is achieved in a uniform manner, such that policies can be made globally available in the network. Further, user policy can be applied independent of the manner in which the user accesses the network.

According to an object of the present invention, a multiservice switching system has a switching device having predetermined functions with respect to a request for a predetermined service, a switch controller that has a bearer function and a virtual switch function in order to control the switching device, and a proxy device that contains service policies related to either enabling or denying the predetermined service, in which multiple service requests are correlated with respective services to enable at least one appropriate policy and logic. The switching device and the switch controller may comprise a conventional switch, such as, for example, an ATM Switch, or a next generation switch.

According to a feature of the invention, the multiservice switching system further comprises a service controller. The service controller may include the switch controller. Alternatively, the switching device may include the switch controller.

According to another object of the invention, a method is disclosed for switching plural forms of data. A customer initiates a request for service. In response to the request, predetermined data related to the requested service is obtained. If the requested service is permitted, the initiating customer is instructed to initiate a setup, such as, for example, a UNI setup, identifying the requested service. A PNNI protocol (setup) is completed across a network in response to the UNI setup, and a second UNI setup is initiated to accept or reject the service request, which is passed back to the initiating customer, wherein multiple service requests are correlated with respective services to enable at least one appropriate policy and logic.

According to a feature of the invention, the data related to the requested service may be obtained using at least one of a push procedure that pushes the predetermined data, a pull procedure that pulls policy and/or logic (e.g., a program)

representing at least one of service capabilities and service permissions, a query (trigger) procedure that queries a service control module, or a certificate procedure that specifies permitted setup parameters. The push (download) procedure and the pull procedure pushes and pulls, respectively, information into a Network Connection Capability, and then makes a decision regarding a service. The query procedure provides facts (e.g., policy and/or logic), and then the service makes a policy and/or logic decision.

According to an advantage of the invention, the certificate may be encrypted. In addition, a sequence number, that assists in preventing reuse of the certificate, may be assigned to the encrypted certificate. By examining the sequence number assigned to the certificate, it is possible to determine whether the sequence number (and thus, the certificate) was seen before. In addition to the assignment of the sequence number (or instead of using the sequence number), the certificate can be time-stamped and/or date-stamped. An examination of the time-stamp and/or date-stamp (with or without the sequence number) assists in determining whether the certificate is valid. If the time-stamp and/or date-stamp exceeds a predetermined delta value, the certificate is determined to be invalid, and thus, the service request is denied.

A still further advantage of the invention resides in the encrypted certificate being able to identify which service allowed the setup.

According to another object of the invention, a method for switching plural forms of data is disclosed. The method comprises initiating a service request by an initiating customer, establishing the service request using a predetermined setup, such as, for example, a user-to-network interface setup, and initiating a second predetermined setup, such as, for example, a user-to-network interface setup, to accept or reject the requested service, wherein multiple service requests are correlated with respective services to enable at least one appropriate policy and logic.

According to a feature of the invention, a Service Control may request that initiating customer initiate the user-to-network interface setup.

According to another feature, if the service request is transferred over an ATM network, the user-to-network interface setup is redirected from a switching device to a service controller.

According to an advantage of the invention, the switching device is controlled by a switch controller. The switch controller may be integral with the switching device, or, alternatively, the switch controller may be integral with the service controller.

Another advantage of the invention is that the service request may be established using at least one of a pushing procedure, a pulling procedure, a query procedure, and a certificate procedure. If the certificate procedure is employed, a certificate may establish what service requests uses the user-to-network interface setup. Further, the certificate may specify what setup parameters are permitted and/or which service allowed the setup.

If desired, the certificate may be encrypted. In addition, at least one of a sequence number, a time-stamp, and a date-stamp may be used with the certificate to assist in verifying that a certificate is valid. Thus, reuse of a certificate may be prevented.

FIG. 1 discloses an example ATM SVC Service that can use the present invention, comprising an initiating SVC service customer 10, a first ATM edge switch 12, an ATM core switch 14, a second ATM edge switch 16, a terminating SVC service customer 18, a first SVC service controller 20, a second SVC service controller 22, and a proxy device, such as, for example, a SVC service policy device 24. However, it is understood that modifications to this arrangement may be made without departing from the scope and/or spirit of the invention.

Further, while the present invention is being described with reference to a UNI signal, it is understood that alternative signal protocols may be used without departing from the spirit and/or scope of the invention.

The SVC customer 10 either initiates or terminates an SVC Service Request using UNI signaling. The SVC customer 10 may correspond to, for example, an individual subscriber, an enterprise network, an ISP or a peer network. In addition, an ISDN to ATM gateway may also act on behalf of an SVC customer. Service policies define the capabilities and resources available to the customer, and also, determine whether a service request succeeds or fails. Example SVC service class capabilities include, but are not limited to, constant bit rate (CBT), real time variable bit rate (rt-VBR), non-real time variable bit rate (nrt-VBR), unspecified bit rate (UBR), available bit rate (ABR), calling line identification presentation and restriction (CLIP/CLIR). Example resources include, but are not limited to, for example, total bandwidth and total number of SVC's.

Figure 2:
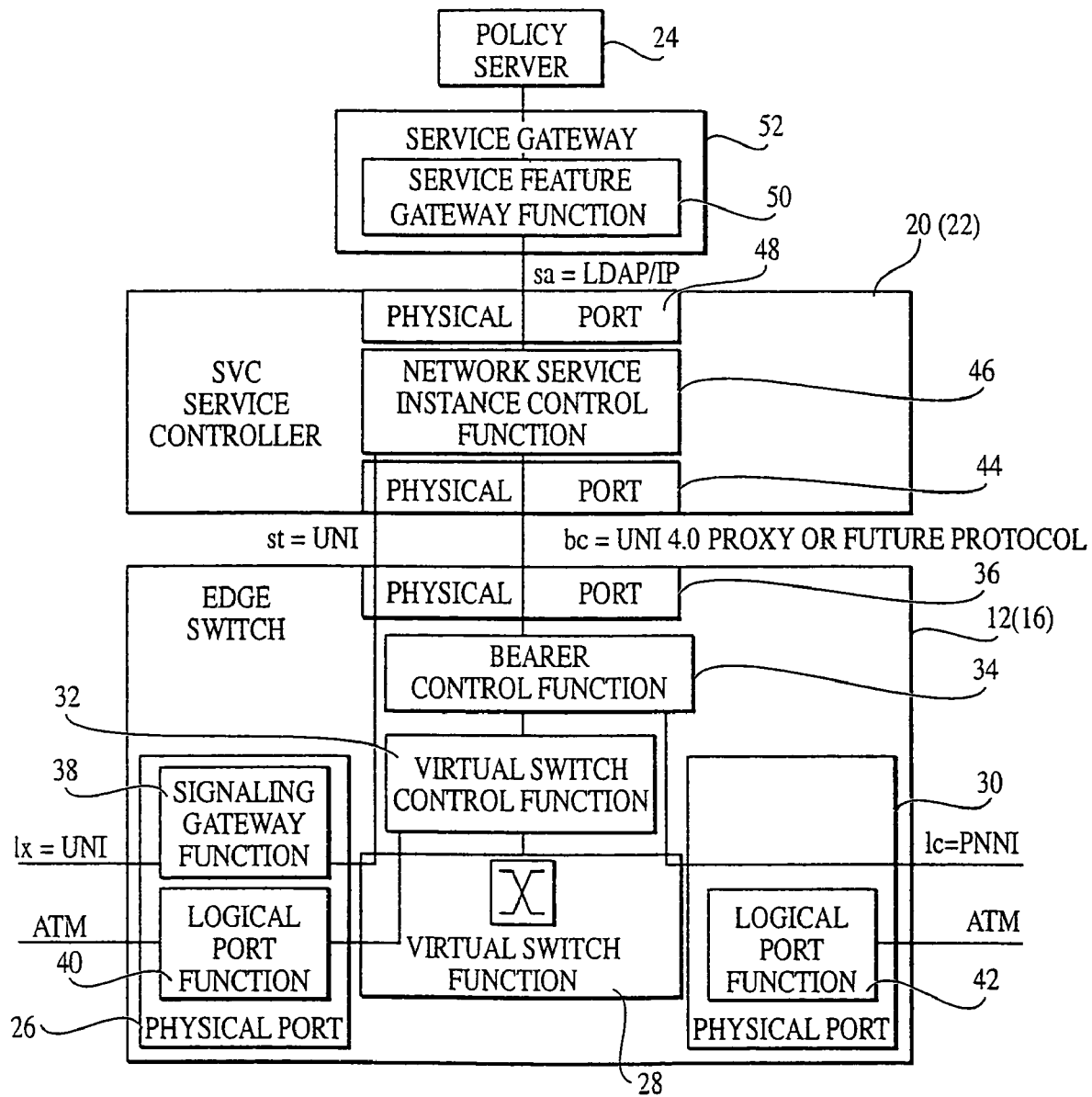
FIG. 2 illustrates a conventional ATM Edge Switch and conventional SVC Service Controller useable with the example ATM SVC service of FIG. 1.

FIG. 1 illustrates the ATM SVC being implemented with conventional ATM switches that contain both bearer control and virtual switch control in addition to the switching function, the structure of which is shown in greater detail in FIG. 2. According to the present invention, the ATM SVC Service Control (e.g., network service instance control function NSICF) is removed from a switching device (e.g., ATM edge switch 12 or 16) and placed within a separate physical controller. In the first embodiment, bearer control and virtual switch control are bundled together (as a switch controller) with switching as part of a single physical unit, and the NSICF is bundled separately as the SVC Service Controller. UNI signaling is redirected from the edge switch to the SVC Service Controller via a permanent virtual circuit (PVC). This allows the SVC Service Controller to apply policy and/or other transformations to UNI setup messages. If the SVC Service Controller permits a setup, the SVC Service Controller functions as a proxy agent for the SVC Service Customer, in accordance with, for example, Annex 2 of ATM UNI Signaling Specification Version 4.0, and issues a UNI setup command to the ATM Edge Switch.

FIG. 2 illustrates a conventional switch. The conventional ATM Edge Switch 12 (or 16) comprises a first physical port 26, a virtual switch 28, a second physical port 30, a virtual switch controller 32, a bearer controller 34, and a third physical port 36. The first physical port 26 includes a signaling gateway 38 and a logical port 40, while the second physical port 30 includes a logical port 42.

The SVC Service Controller 20 (or 22) includes a first physical port 44, a Network Service Instance Control Function (NSICF) 46, and a second physical port 48.

As shown in FIG. 2, an optional Service Gateway 50 is interfaced between the SVC Service Controller 20 (or 22) and the policy Server 24.

It is noted that the construction and operation of the ATM Edge Switch, the SVC Service Controller and the Service Gateway is known to those skilled in the art. Thus, a detailed described of the structure and operation of these elements is omitted. It is further understood that variations in the construction of the Edge Switch, SVC Service Controller and Service Gateway may be made without departing from the scope and/or spirit of the invention.

While the invention is described with respect to an ATM SVC service, it is understood that the invention is not limited to ATM SVC service, but may be utilized with other network services.

In order to implement the ATM SVC Service outside of the conventional switch, a UNI signaling channel, produced by an SVC Service Customer, is redirected to an SVC Service Controller by a PVC or S-PVC. An SVC Service Customer may correspond with an individual subscriber (connected by, but not limited to, for example) an xDSL connection, an ISDN connection (using, for example, an ISDN to ATM Internetwork gateway), an enterprise network, an ISP or a peer network. In the disclosed embodiment, policies are stored in the database 24 (e.g., policy server) that is physically separate from an individual Service Controller 20 (or 22). The database 24 is accessed by a service gateway 52 associated with the Service Gateway 50. The policy server 24 checks policies of both the calling party and the called party.

While the policy server 24 is shown as being physically separate from the SVC Service Controllers, it is understood that variations in form, such as, but not limited to, for example, incorporating the policies in one or more SVC Service Controllers 20 (or 22), may be made without departing from the spirit and/or scope of the invention.

The present invention discloses the use of a predetermined setup, such as, for example, UNI version 4.0 proxy, for the purpose of accessing bearer control. As a result, the NSICF 46 terminates the UNI stack. However, it is understood that different protocols (such as, but not limited to, UNI version 3.1) may be used for accessing bearer control without departing from the scope and/or spirit of the invention.

Figure 3:
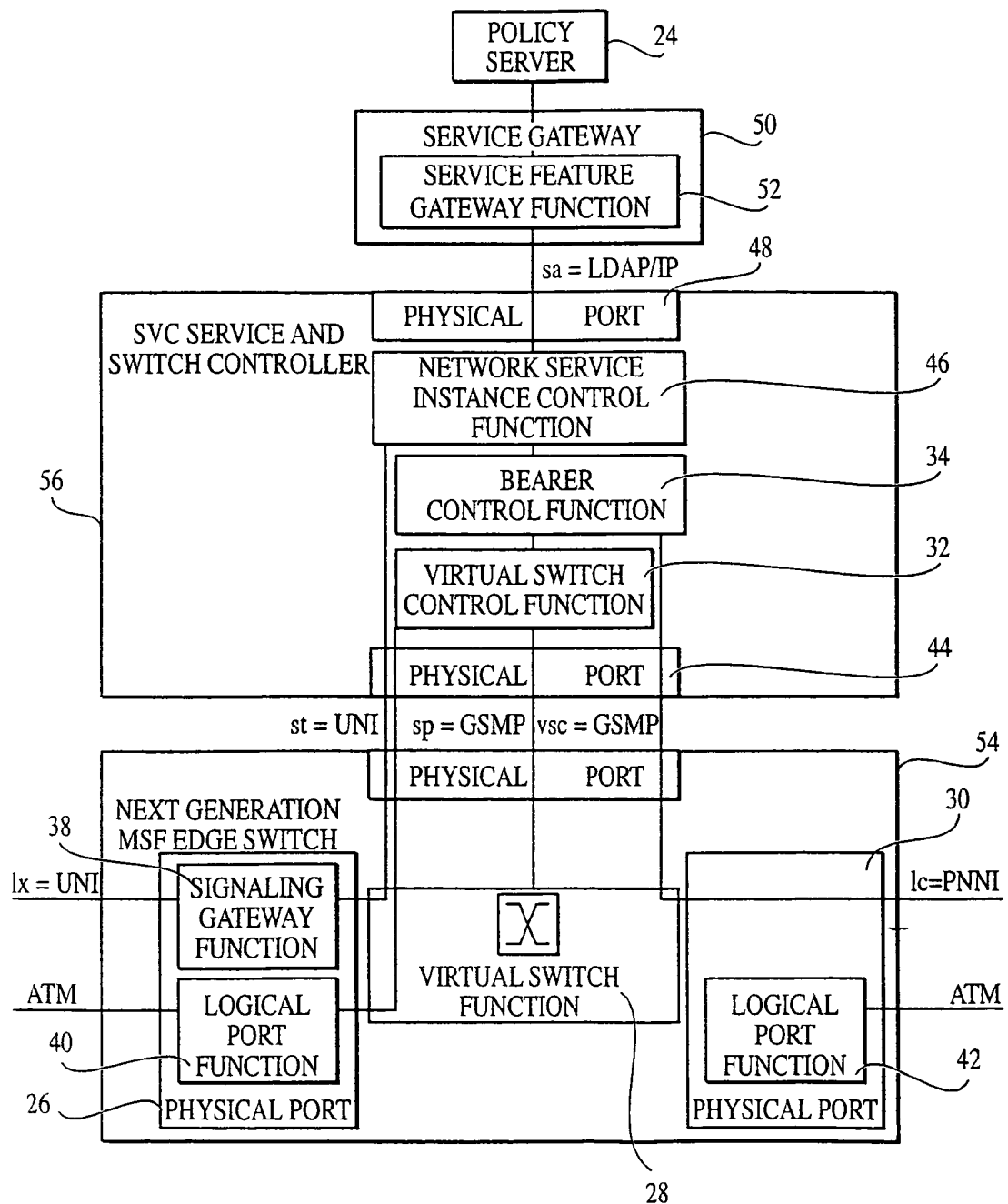
FIG. 3 illustrates a next generation ATM Edge Switch and SVC Service and Switch Controller useable with the example ATM SVC service of FIG. 1.

FIG. 3 illustrates an example of an ATM Switch, in which the ATM SVC Service is implemented using a next generation Multiservice Switching Function (MSF) ATM switch 54. In this regard, elements in this example that correspond to like elements in the first example are designated with the same element number. Further, a detailed discussed of such elements is not required.

In the second example, the virtual switch controller 32 and the bearer controller 34 are removed from the switch and are placed in a separate SVC Service Switch Controller 56, along with the NSICF 46. Further, UNI signaling passes through the switch 54 and on to the NSICF 46 within the Switch Controller 56. It is noted that for purposes of simplification, FIG. 3 omits physical paths sp and vsc.

The NSICF 46 applies policy and screening to a UNI setup message based on a calling party and a called party, a requested service class, etc., via the service feature gateway function. If the setup message is successful, the NSICF 46 invokes the bearer control function 34 that resides within the Switch Controller 56 that provides access to the network's SVC capability. The Signaling Gateway function is placed within the physical port to denote that the UNI signaling crosses the boundary from customer to network, and that it is being re-directed via a PVC to the NSICF. No policy is applied and the transport of the signaling does not change. The Bearer Control function 34 is implemented by initiating a PNNI protocol in the network direction in order to create a bearer connection across the network. Further, the Logical Port function is accessed via the virtual switch control function along sp to access this function.

It is noted that in a multiservice environment, service control is not limited to ATM SVC's. Other transport devices, such as, but not limited to, for example, Frame relay and IP layered on top of ATM, may be used.

The present invention solves the problem of multiple services sharing the same Network Connection Capability while utilizing a common UNI Signaling method. In the following discussion, it is assumed that a calling party needs to access different Network Connection Capabilities based upon the services the calling party participates in.

According to the instant invention, service customers access a service using either a dedicated signaling channel or a signaling network (which may optionally be IP based). During a service interaction, an ATM SVC Connection must be established between customers. Thus, one of the end-systems initiates a UNI setup. Once the UNI initiates the SVC's between the ATM SVC Service and other Services, the Network Connection Capability correlates the calling party setup request with the service it belongs to, so that an appropriate policy is applied.

The end-systems, the service, and the Network Connection Capability must coordinate their actions. Specifically, the Network Connection Capability must enable the enforcement of the service policy and/or logic (e.g., a program module) at least during the initial setup. In addition, the called party must be able to map an incoming UNI to the appropriate service/application.

Four procedures are discussed below for enabling enforcement of the service policy and/or logic, in accordance with the present invention. However, it is understood that the invention is not limited to the four procedures discussed below, and thus, should not be interpreted as limiting the scope of the invention; alternative procedures may be employed without departing from the scope and/or spirit of the invention.

In the first procedure, to be discussed in detail below, the Service downloads (pushes) policy and/or logic into the Network Connection Capability before it requests the end-user to do a UNI setup. In the second procedure, to be discussed in detail below, the Network Connection Capability pulls in policy and/or logic from the Service when it receives a setup or other signaling message. In the third procedure, to be discussed in detail below, the Network Connection Capability queries the Service when it receives a setup or other signaling message. In the fourth procedure, to be discussed below in detail, the Service sends the service customer an encrypted certificate that allows a setup phase to go through without requiring interaction between the Service and the Network Connection Capability.

It is noted that the Network Connection Capability must be able to map the incoming setup to the corresponding service in the first through third procedures. In the fourth procedure, the service provides the end-system with a (preferably non-reusable) certificate that allows it to do the permitted setup. The end-system of the fourth procedure includes the certificate in its setup message, so that the controller does not have to consult with the service in order to determine whether to allow the setup. It is noted that while the certificate is preferably encrypted with the permissions as well as a sequence number, this is not a requirement of the instant invention.

The first procedure will now be described with reference to FIG. 4. In the first procedure, policy and/or logic is pushed (downloaded) into the Network Connection Capability before it requests the end-system to do a UNI setup. In accordance with this procedure, the Network Connection Capability maps the incoming setup to a corresponding service. This requires encoding a service instance unique ID (s_id), using known techniques, in the setup from the calling party.

At step 1 (see FIG. 4), a service request is made to a Service Controller 58. The Service Controller 58 then pushes (step 2) policy and/or logic to control the Network Connection Capability. Then, in step 3, the Service Control 58 requests that the service customer 10 initiate a UNI setup containing the s_id. The UNI setup is directed (step 4) from the customer 10 to the SVC Controller 20 (located within the Network Connection Capability), and contains the s_id. Since multiple customers may initiate multiple SVC's corresponding to a single service, the s_id functions to identify the service and the SVC instance for the particular customer.

In step 5, a proxy UNI is sent to the edge switch 12. As a result, PNNI is transmitted across the network (step 6), which results in the forwarding of a proxy UNI to the SVC Controller 22 (located within the Network Connection Capability) at step 7. Thereafter, step 8 is performed to initiate UNI to the service customer 18.

Figure 4:
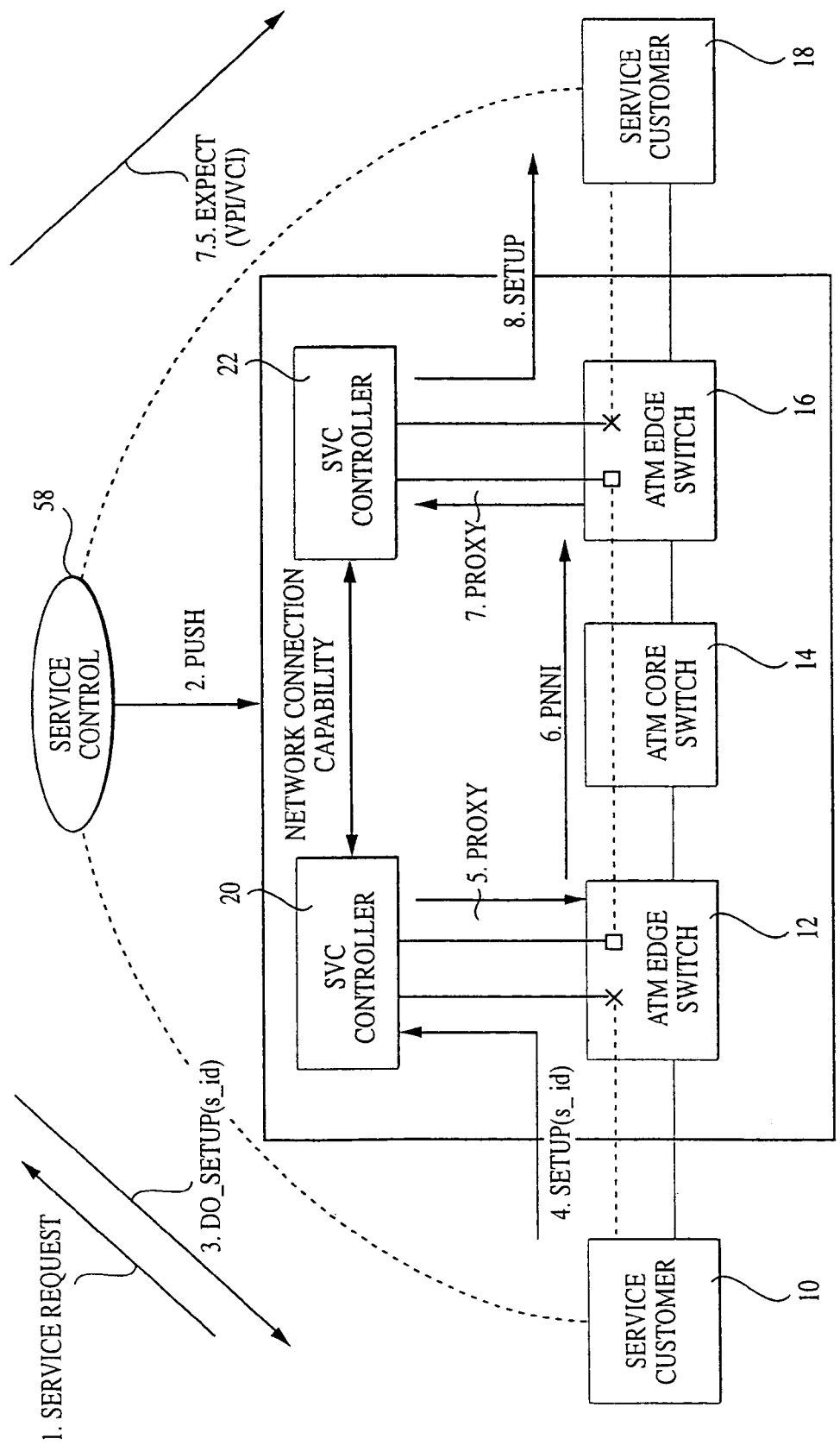
FIG. 4 illustrates an operation chart for a push method performed in accordance with the instant invention.

In order for the customer to map the incoming UNI setup to an application, either the setup contains an application identifier or one of the SVC Controller 22 or the Service Control 58 must alert the service customer 18 of the incoming UNI and its Virtual Path Identifier/Virtual Channel Identifier (VPI/VCI), which is illustrated in FIG. 4 as step 7.5. If the application identifier and service identifier are the same, the s_id can be used. However, since this may not be the case, a different identifier is preferably used.

Figure 5:
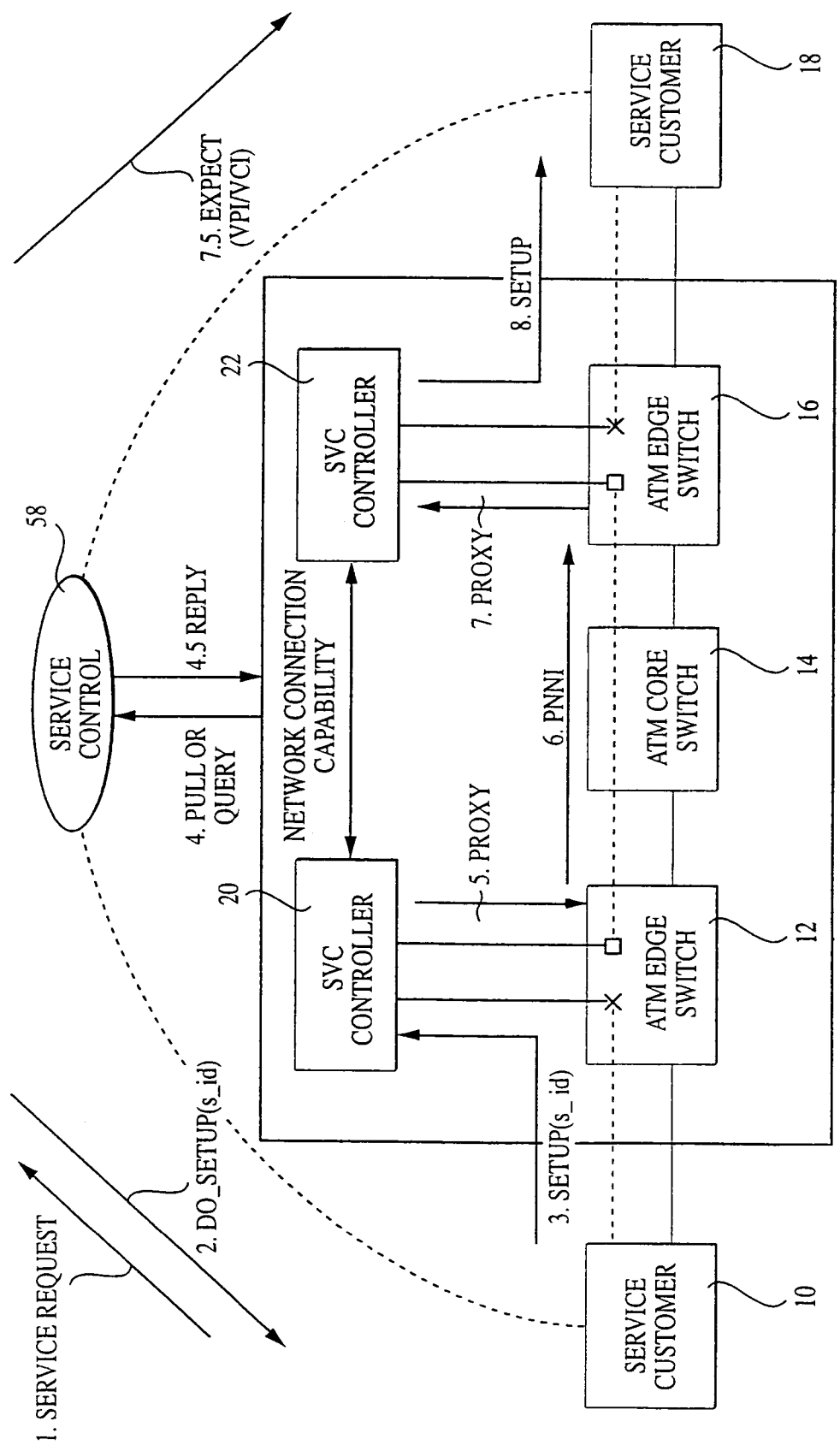
FIG. 5 illustrates an operation chart for a pull method and a query method performed in accordance with the instant invention.

The second procedure will now be described with reference to FIG. 5. In the second procedure, the Network Connection Capability pulls in policy and/or logic in a manner similar to that described in the first procedure.

At step 1 (see FIG. 5), a service request is made to the Service Control 58. In step 2, the Service Control 58 requests that the service customer 10 initiate a UNI setup containing s_id. The UNI setup is directed (step 3) from the customer 10 to the SVC Controller 20 (located within the Network Connection Capability), and contains the s_id. Since multiple customers may initiate multiple SVC's corresponding to a single service, the s_id functions to identify the service and the SVC instance for the particular customer. Step 4 is then performed, in which the Network Connection Capability pulls policy and/or logic from the Service Control 58, which is completed by the reply provided in step 4.5.

In step 5, a proxy UNI is sent to the edge switch 12. As a result, PNNI is used to do an SVC across the network (step 6), which results in a proxy UNI to the SVC Controller 22 (located within the Network Connection Capability) at step 7. Thereafter, step 8 is performed to initiate UNI to the service customer 18. As in the first procedure, the SVC Controller 22 or the Service Control 58 alerts (step 7.5) the service customer 18 of the incoming UNI and its VPI/VCI.

The third procedure will now be described. As this procedure is similar to the pull procedure (e.g., second procedure) described above, the following discussion will only be directed to the differences.

In the third procedure, an incoming setup message results in a query to an appropriate service control module. Other queries, based, on, for example, mid-call signaling events, can also be defined. The query procedure includes a query and a response. In the case of a setup, the response contains information indicating whether the setup should go through, and under what conditions.

It is noted that in the second and third procedures, the interaction between the Network Connection Capability and the Service Control 58 must be timely, in order to avoid a time out condition. Further, the s_id is needed in the setup that uniquely identifies the service.

The third procedure differs from the first and second procedures in at least one important respect. Specifically, in the query procedure, the service is not constrained by the capabilities of the SVC Controller that interprets service policy and/or logic.

The fourth procedure will now be described with reference to FIG. 6. In the fourth procedure, multiple services use the same network connection capability under UNI Signaling without requiring an interaction between the services and the network connection capability. In accordance with this procedure, the Service Control 58 provides the service customer 10 with a certificate allowing it to do a permitted setup. The certificate specifies permitted setup parameters. The service customer 10 includes the certificate in its setup message. In this regard, it is noted that the network connection capability does not need to consult with the Service Control 58 in order to allow the setup. The certificate uniquely identifies which service allowed the setup, so that billing and accounting can be properly performed when this procedure is used with third parties.

While the following discussion indicates that the certificate are encrypted, it is noted that the encryption may be omitted without departing from the spirit and/or scope of the invention. It is also noted that the certificate may contain the permissions and/or a sequence number. According to the disclosed fourth procedure, certificates are non-reusable. Further, since events may happen asynchronously, the certificates may not necessarily be used in the order that they are received.

Each network service (s) has a private key (E.s) that is used to encrypt certificates. For each encryption key, the network connection capability has a private decryption key (D.s). As a result, only the network connection capability can read a certificate, and only the network service can have originally generated the certificate. Further, according to the disclosed procedure, each certificate is preferably encrypted with a unique sequence number in order to ensure that a previous certificate is not used again. When the Network Connection Capability decrypts a certificate, the Network Connection Capability examines the sequence number to determine whether the certificate has been seen before.

Keeping a record of each and every certificate (with their associated sequence number) that has been received would require a very large database. In order to minimize the size of this database, a preferred feature of the fourth procedure is to generate certificates in which subsequently generated certificates have increasing sequence numbers. As a result, the network connection capability only needs to keep a limited size history (which changes over time) of previously seen certificates for each service. In addition, the size of the database that must be maintained can be further reduced by date-stamping (and/or time-stamping) the certificates in addition to assigning sequence numbers. If the date-stamped (and/or time-stamped) certificate exceeds a predetermined delta value (such as, but not limited to, for example, 1 day and/or 1 minute), the certificate (and thus connection request) is rejected.

Figure 6:
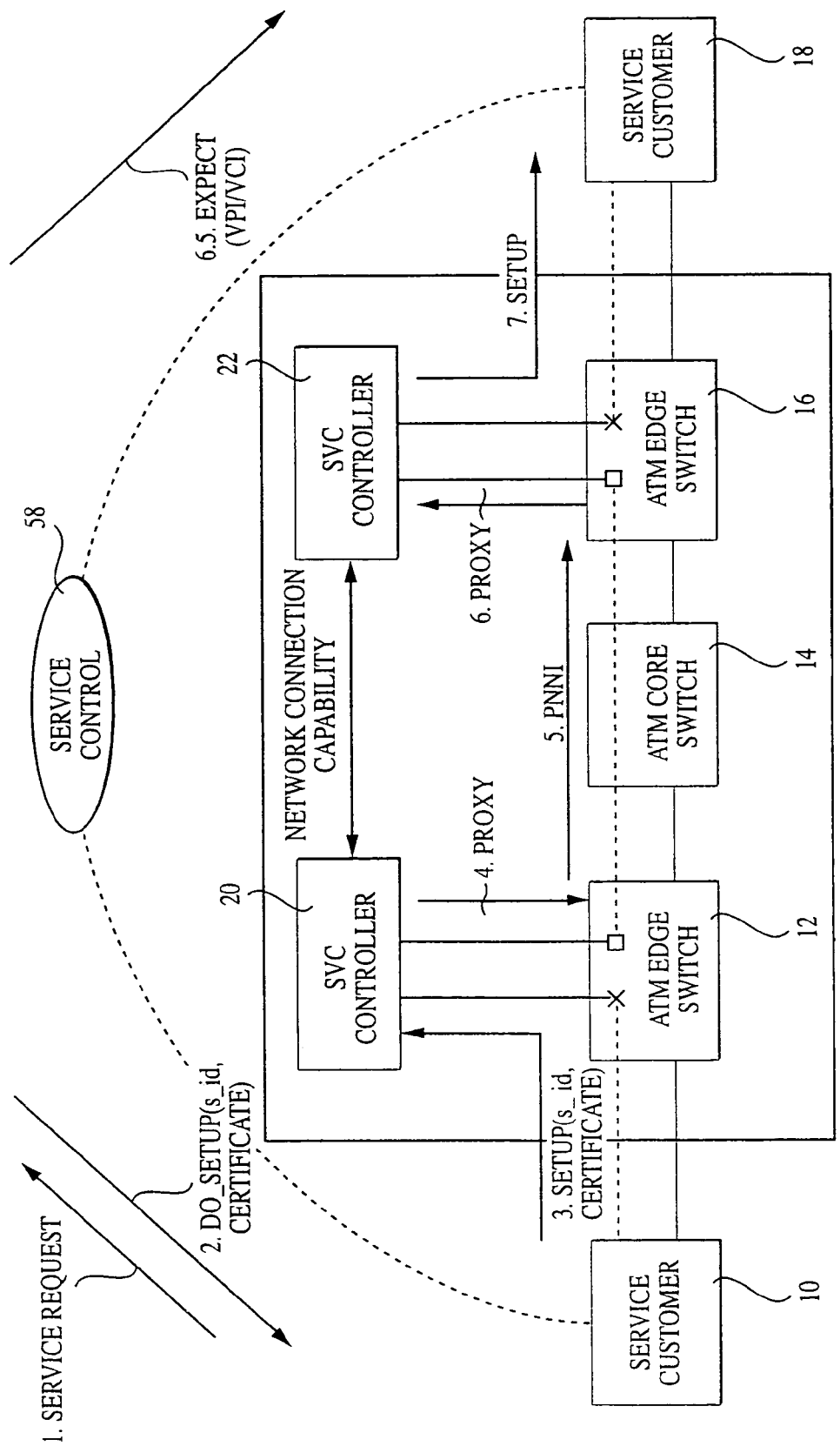
FIG. 6 illustrates an operation chart for a method using certificates performed in accordance with the instant invention.

Referring to FIG. 6, a service request is initially made to a Service Control 58 at step 1. In response, the Service Control 58 requests (steps 2) that the service customer 10 initiate a certificate and a UNI setup containing s_id. The UNI setup (containing the s_id and certificate) is directed (step 3) from the customer 10 to the SVC Controller 20 that is located within the Network Connection Capability.

In step 4, a proxy UNI is sent to the edge switch 12. As a result, PNNI is transmitted across the network (step 5), which results in a proxy UNI being sent to the SVC Controller 22 (located within the Network Connection Capability) at step 6. As in the first method, the SVC Controller or the Service Control 58 alerts (step 6.5) the service customer of the incoming UNI and its VPI/VCI. Thereafter, step 7 is performed to initiate UNI to the service customer 18.

The discussion above illustrates certain procedures for achieving the network connection. As previously noted, the instant invention is not dependent upon the specific implementation described above. Consequently, other implementations may be utilized without departing from the spirit and/or scope of the invention.

It is noted that the push (download) procedure (e.g., the first procedure) allows third party service providers to be connected by the Internet, whereas the other disclosed procedures may not. It is further noted that once policy and/or logic is pushed (per the first procedure), it is locally available to a SVC Controller, where it can be applied in real-time to setup messages, as opposed to waiting to pull it in (per the second procedure) or querying to a service (per the third procedure).

Further, the various procedures described above may be combined. For example, the push procedure may be combined with the query procedure. In such a combination, a setup can operate to query a service controller which then pushes policy and logic; alternatively (or in addition), queries can be placed on variables that represent the state of a call.

The foregoing discussion has been provided merely for the purpose of explanation and is in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It is also noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writeable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

In addition, although the present specification describes components and functions implemented in the embodiments with reference to particular standards and protocols, the invention is not limited to such standards and protocols. The standards for Internet and other packet-switched network transmission (e.g., TCP/IP, UDP/IP, HTML, SHTML, DHTML, XML, PPP, FTP, SMTP, MIME); peripheral control (IrDA; RS232C; USB; ISA; ExCA; PCMCIA); and public telephone networks (ISDN, ATM, xDSL) represent examples of the state of the art. Such standards are periodically superseded by faster or more efficient equivalents having essentially the same functions. Replacement standards and protocols having the similar functions are considered equivalents.

We claim:

1. A system for implementing a plurality of services, the system comprising:
    a service controller, configured to provide service policy and logic associated with the plurality of services in response to service requests initiated by end users; and
    a network connection capability comprising:
        a switching device, configured to establish connections over a network;
        a switch controller having a bearer function and a virtual switch control function for controlling said switching device based on network policy and logic; and
        a proxy device that correlates the service requests with respective services of the plurality of services in response to a network connection request to enable the associated service policies and logic provided by the service controller, and that initiates connections to the network via the switch controller based on at least the associated service policy and logic of the requested services.

2. The system of claim 1, wherein said switching device and said switch controller comprise a conventional switch.

3. The system of claim 2, wherein said conventional switch comprises an ATM Switch.

4. The system of claim 1, wherein said switching device and said switch controller comprise a next generation switch.

5. The system of claim 1, wherein said switching device includes said switch controller.

6. A method for controlling network connections based on policy and logic of requested services, the method comprising:
    receiving, from an initiating customer, a request for at least one service of a plurality of services;
    obtaining predetermined data related to the at least one requested service, the predetermined data correlating to at least one of a policy and logic corresponding to the requested service;
    instructing the initiating customer to initiate a predetermined setup identifying the requested service and, in response to the predetermined setup, initiating a network connection based on the at least one policy and logic corresponding to the requested service;
    passing a first predetermined signal across a network in response to the predetermined setup;
    initiating a second predetermined setup, in response to the passed first predetermined signal;

passing a second predetermined signal across the network in response to the second predetermined setup, the second predetermined signal indicating whether to allow the network connection based on at least one of policy and logic of the network; and providing to the initiating customer a response indicating whether the network connection is allowed.

7. The method of claim 6, wherein obtaining comprises pushing the predetermined data.

8. The method of claim 7, wherein the pushing predetermined data comprises pushing the at least one of policy and logic representing at least one of service capabilities and service permissions.

9. The method of claim 6, wherein obtaining comprises pulling the predetermined data.

10. The method of claim 6, wherein obtaining comprises querying a service control module for the predetermined data.

11. The method of claim 6, further comprising using a certificate to specify permitted setup parameters.

12. The method of claim 11, further comprising encrypting the certificate.

13. The method of claim 12, further comprising assigning a sequence number to the encrypted certificate.

14. The method of claim 11, wherein the certificate further identifies which service allowed the setup.

15. The method of claim 11, further comprising determining whether the certificate is valid.

16. The method of claim 11, further comprising preventing reuse of the certificate.

17. The method of claim 16, wherein preventing comprises examining a sequence number assigned to the certificate to determine whether the sequence number was seen before.

18. The method of claim 16, wherein preventing comprises examining at least one of a time-stamp and a date-stamp to determine whether the at least one of the time-stamp and the date-stamp exceeds a predetermined delta value.

19. A method for controlling connections to a network based on policy and logic of requested services, the method comprising:

receiving, at a service controller, a service request initiated by an initiating customer;

obtaining predetermined data from the service controller related to at least one of policy and logic of the requested service;

establishing a connection to the network using a first predetermined setup, initiated to realize the requested service in accordance with the at least one policy and logic of the service; and initiating a second predetermined setup to one of accept and reject the requested network connection on behalf of the requested service and in accordance with at least one of policy and logic of the network.

20. The method of claim 19, wherein obtaining the predetermined data for the requested service comprises using a pushing procedure.

21. The method of claim 19, wherein obtaining the predetermined data for the requested service comprises using a pulling procedure.

22. The method of claim 19, wherein obtaining the predetermined data for the requested service comprises using a query procedure.

23. The method of claim 19, further comprising requesting the initiating customer to initiate the predetermined setup as a user-to network interface setup.

24. The method of claim 19, the network comprising an ATM network, wherein establishing the network connection to realize the requested service comprises transferring the first predetermined setup over the ATM network, the first predetermined setup being redirected from a switching device to the service controller.

25. The method of claim 24, further comprising controlling the switching device with a switch controller, the switch controller being integral with the switching device.

26. The method of claim 24, further comprising controlling the switching device with a switch controller, the switch controller being integral with the service controller.

27. The method of claim 19, wherein obtaining the predetermined data for the requested service comprises providing a certificate for establishing the network connection in combination with the predetermined setup.

28. The method of claim 27, wherein the certificate specifies at least a permitted setup parameter.

29. The method of claim 27, further comprising encrypting the certificate.

30. The method of claim 29, further comprising assigning a sequence number to the encrypted certificate.

31. The method of claim 27, wherein the certificate further identifies the requested service, which allowed the setup.

32. The method of claim 27, further comprising determining whether the certificate is valid.

33. The method of claim 27, further comprising preventing reuse of the certificate.

34. The method of claim 33, wherein preventing comprises examining a sequence number assigned to the certificate to determine whether the sequence number was previously examined.

35. The method of claim 33, wherein preventing comprises examining at least one of a time-stamp and a date-stamp to determine whether the at least one of the time-stamp and the date-stamp exceeds a predetermined delta value.

36. The method of claim 6, wherein the predetermined setup comprises a UNI setup, the first predetermined signal comprises a PNNI protocol, and the second predetermined setup comprises a second UNI setup.

37. The method of claim 19, wherein the predetermined setup comprises a user-to-network interface setup.

38. A method for controlling customer access to capabilities of a network associated with a network service, the method comprising:

receiving from a customer system a request for the network service;

instructing the customer system to perform a connection setup request, the instructing comprising a certificate and specification of a unique identifier to be included in the connection setup request, the unique identifier correlating the connection setup request and the network service;

receiving from the customer system, at a network connection capability, the connection setup request, including the unique identifier;

processing the connection setup request based on the certificate and the unique identifier and at least one of policy and logic associated with the network service; and performing one of establishing a network connection and rejecting the connection setup request based on the processing, in accordance with the certificate and the at least one of service policy and logic.

39. A system for controlling customer access to capabilities of a network associated with a network service, the system comprising:
 a service controller that receives a request for the network service from a customer system and instructs the customer system to perform a connection setup request, the instructing comprising a certificate and specification of a unique identifier to be included in the connection setup request, the unique identifier correlating the connection setup request and the network service; and a network connection capability controller that receives the connection setup request, including the certificate and the unique identifier, from the customer system;

wherein the network connection capability controller processes the connection setup request based on the certificate, the unique identifier and at least one of policy and logic associated with the network service, and performs one of establishing a network connection and rejecting the connection setup request based on the processing, in accordance with the certificate and the at least one of policy and logic.

\* \* \* \* \*